United States Patent
Sutherland

(10) Patent No.: US 10,626,753 B2
(45) Date of Patent: Apr. 21, 2020

(54) HEAT RECOVERY SYSTEM

(71) Applicant: ROLLS-ROYCE plc, London (GB)

(72) Inventor: Roger Alexander Sutherland, Derby (GB)

(73) Assignee: ROLLS-ROYCE PLC, London (GB)

( * ) Notice: Subject to any disclaimer, the term of this patent is extended or adjusted under 35 U.S.C. 154(b) by 651 days.

(21) Appl. No.: 15/096,836

(22) Filed: Apr. 12, 2016

(65) Prior Publication Data

US 2016/0326908 A1 Nov. 10, 2016

(30) Foreign Application Priority Data

May 7, 2015 (GB) .................................. 1507817.3

(51) Int. Cl.
*F01K 7/16* (2006.01)
*F01D 25/12* (2006.01)
(Continued)

(52) U.S. Cl.
CPC ................ *F01K 7/16* (2013.01); *F01D 15/10* (2013.01); *F01D 15/12* (2013.01); *F01D 17/02* (2013.01);
(Continued)

(58) Field of Classification Search
CPC . F01K 23/06; F01K 23/16; F01K 7/16; F01K 25/08; F01K 27/02; F02C 9/18;
(Continued)

(56) References Cited

U.S. PATENT DOCUMENTS 4,476,674 A * 10/1984 Berman ................ F01K 23/062
60/39.182
7,047,744 B1 * 5/2006 Robertson ............... F01K 25/08
290/52

(Continued)

FOREIGN PATENT DOCUMENTS

DE 102008005301 A1 7/2009
DE 102012222035 A1 6/2014
(Continued)

OTHER PUBLICATIONS

Nov. 5, 2015 Search Report issued in British Patent Application No. 1507817.3.
(Continued)

*Primary Examiner* — Craig Kim
(74) *Attorney, Agent, or Firm* — Oliff PLC

(57) ABSTRACT

A pulsed pressure, heat recovery system includes a pressure vessel for holding a vaporisable first fluid. The vessel contains a heat exchanger, and provides communication to the heat exchanger for flow of a heated second fluid. The heat exchanger enables heat transfer from the second fluid to vaporise the first fluid. The system also includes a flow loop for the first fluid extending from an outlet of the vessel to an inlet to the vessel, having in series: a first non-return valve, a turbine and a second non-return valve. The first non-return valve allows the vaporised first fluid to flow from the vessel to the turbine when the pressure of the vaporised first fluid in the vessel exceeds a predetermined limit. The turbine extracts energy from expansion of the vaporised first fluid. The second non-return valve prevents flow reversal around flow loop between the turbine and the inlet.

7 Claims, 3 Drawing Sheets

(51) Int. Cl.

| | |
|---|---|
| *F01K 23/06* | (2006.01) |
| *F01K 23/16* | (2006.01) |
| *F01K 25/08* | (2006.01) |
| *F01D 15/10* | (2006.01) |
| *F01D 15/12* | (2006.01) |
| *F01D 17/02* | (2006.01) |
| *F01D 17/10* | (2006.01) |
| *F01D 25/18* | (2006.01) |
| *F02C 9/18* | (2006.01) |
| *F25B 11/02* | (2006.01) |
| *F25B 27/02* | (2006.01) |
| *F25B 41/04* | (2006.01) |
| *F25B 49/00* | (2006.01) |

(52) U.S. Cl.
CPC ............ *F01D 17/10* (2013.01); *F01D 25/12* (2013.01); *F01D 25/18* (2013.01); *F01K 23/06* (2013.01); *F01K 23/16* (2013.01); *F01K 25/08* (2013.01); *F02C 9/18* (2013.01); *F25B 11/02* (2013.01); *F25B 27/02* (2013.01); *F25B 41/04* (2013.01); *F25B 49/00* (2013.01); *F05D 2220/32* (2013.01); *F05D 2260/213* (2013.01); *F23R 2900/00* (2013.01); *F23R 2900/00018* (2013.01)

(58) Field of Classification Search
CPC . F01D 25/12; F01D 25/18; F01D 5/02; F01D 15/12; F01D 17/02; F01D 17/10; F23R 2900/00; F23R 2900/00018
See application file for complete search history.

(56) References Cited

U.S. PATENT DOCUMENTS

| | | | |
|---|---|---|---|
| 2002/0121089 A1 | 9/2002 | Filippone | |
| 2004/0088993 A1* | 5/2004 | Radcliff | F01K 23/08 60/772 |
| 2009/0204305 A1* | 8/2009 | Ishibashi | F01D 19/00 701/100 |
| 2010/0071368 A1* | 3/2010 | Kaplan | F01K 7/025 60/651 |
| 2014/0144124 A1* | 5/2014 | Mazumder | F02C 7/047 60/39.093 |
| 2015/0321130 A1* | 11/2015 | Beier | B01D 45/12 96/306 |
| 2015/0354414 A1* | 12/2015 | Gibble | F01K 13/02 165/52 |

FOREIGN PATENT DOCUMENTS

| | | |
|---|---|---|
| EP | 0392801 A2 | 10/1990 |
| EP | 1801364 A1 | 6/2007 |
| JP | S603489 A | 1/1985 |
| WO | 2014/154568 A1 | 10/2014 |

OTHER PUBLICATIONS

Sep. 28, 2016 European Search Report issued in European Patent Application No. 16164915.

\* cited by examiner

HEAT RECOVERY SYSTEM

FIELD OF THE INVENTION

The present invention relates to a pulsed pressure, heat recovery system.

BACKGROUND

Waste heat in most aerospace applications is rejected into the atmosphere using air/oil or returned to the engine using fuel/oil heat exchangers. With modern gas turbine engine concepts having geared low pressure systems, the amount of low grade heat is increasing to a level where conventional systems may not be able to keep oil or fuel temperatures to acceptable levels.

SUMMARY

In general terms, the present invention provides a pulsed pressure, heat recovery system which alternates between periods in which heat is transferred from one fluid into another vaporisable fluid, and periods in which the transferred heat is extracted from the vaporisable fluid as useful work. In gas turbine applications, the recovery system can thus not only help to reduce oil temperatures, but can also convert low grade heat into usable power to improve overall engine efficiency.

Accordingly, in a first aspect the present invention provides a pulsed pressure, heat recovery system including:

a pressure vessel for holding a vaporisable first fluid, the pressure vessel containing a heat exchanger, and providing communication to the heat exchanger for flow of a heated second fluid therethrough, whereby the heat exchanger enables heat transfer from the heated second fluid to vaporise the first fluid; and a flow loop for the first fluid extending from an outlet of the pressure vessel to an inlet to the pressure vessel, the flow loop having in flow series: a first non-return valve, a turbine and a second non-return valve, the first non-return valve allowing the vaporised first fluid to flow from the pressure vessel to the turbine when the pressure of the vaporised first fluid in the pressure vessel exceeds a predetermined limit, the turbine extracting energy from expansion of the vaporised first fluid flowing therethrough, and the second non-return valve (38) preventing flow reversal around flow loop between the turbine and the inlet;

wherein the heat recovery system alternates between periods in which the pressure of the vaporised first fluid in the pressure vessel exceeds the predetermined limit and energy is extracted by the turbine, and periods of pressure build up in the pressure vessel when the pressure of the first fluid in the pressure vessel is below the predetermined limit.

In a second aspect, the present invention provides a gas turbine engine, such as a geared turbofan engine, having the heat recovery system of the first aspect. For example, the second fluid may be engine lubricant oil or compressed air bled from the engine compressor. Conveniently, the gas turbine engine may further have an auxiliary gearbox driven by the engine, and the turbine may provide additional mechanical power to drive the auxiliary gearbox Optional features of the invention will now be set out. These are applicable singly or in any combination with any aspect of the invention.

The first fluid can be, for example, 1,1,1,3,3-pentafluoropropane (R-245fa) or 1,1,1,2-tetrafluoroethane (R-134a). Such fluids are particularly suitable for use with an oil-based second fluid, where oil-side temperatures in the heat exchanger of around 90° C. are typical. If the second fluid is significantly hotter, e.g. as is typically the case with bled compressed air, then a different first fluid can be used to match to the temperature of the bled air. Bled air temperatures can be about 700° C. in the case of a high-pressure compressor bleed, but are generally lower for earlier stage compressors.

The heat recovery system may further include a pump on the flow loop for returning the expanded first fluid to the pressure vessel through the inlet.

The heat recovery system may further include a secondary heat exchanger on the flow loop for re-condensing the expanded first fluid.

The non-return valves may be passively controlled, i.e. they may open and close automatically at pre-set pressures. Another option, however, is for the heat recovery system to further include a controller which monitors the pressure in the pressure vessel and which controls the opening and closing of the non-return valves.

The heat recovery system may further include a generator which is driven by the turbine to generate electrical power.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Figure 1:
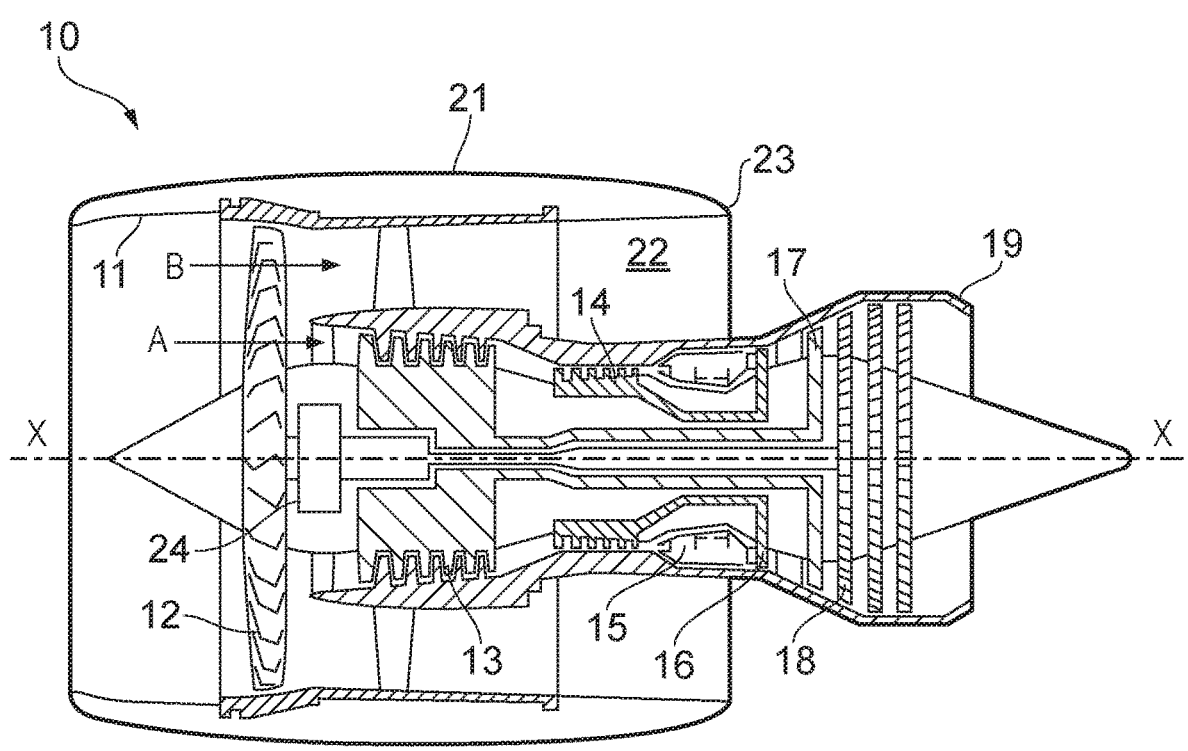
FIG. 1 shows a longitudinal cross-section through a geared, ducted fan gas turbine engine.

With reference to FIG. 1, a geared, ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts. A reduction gearbox 24 on the interconnecting shaft between the low-pressure turbine and the fan, reduces the rotational speed of the fan relative to the low-pressure turbine.

Figure 2:
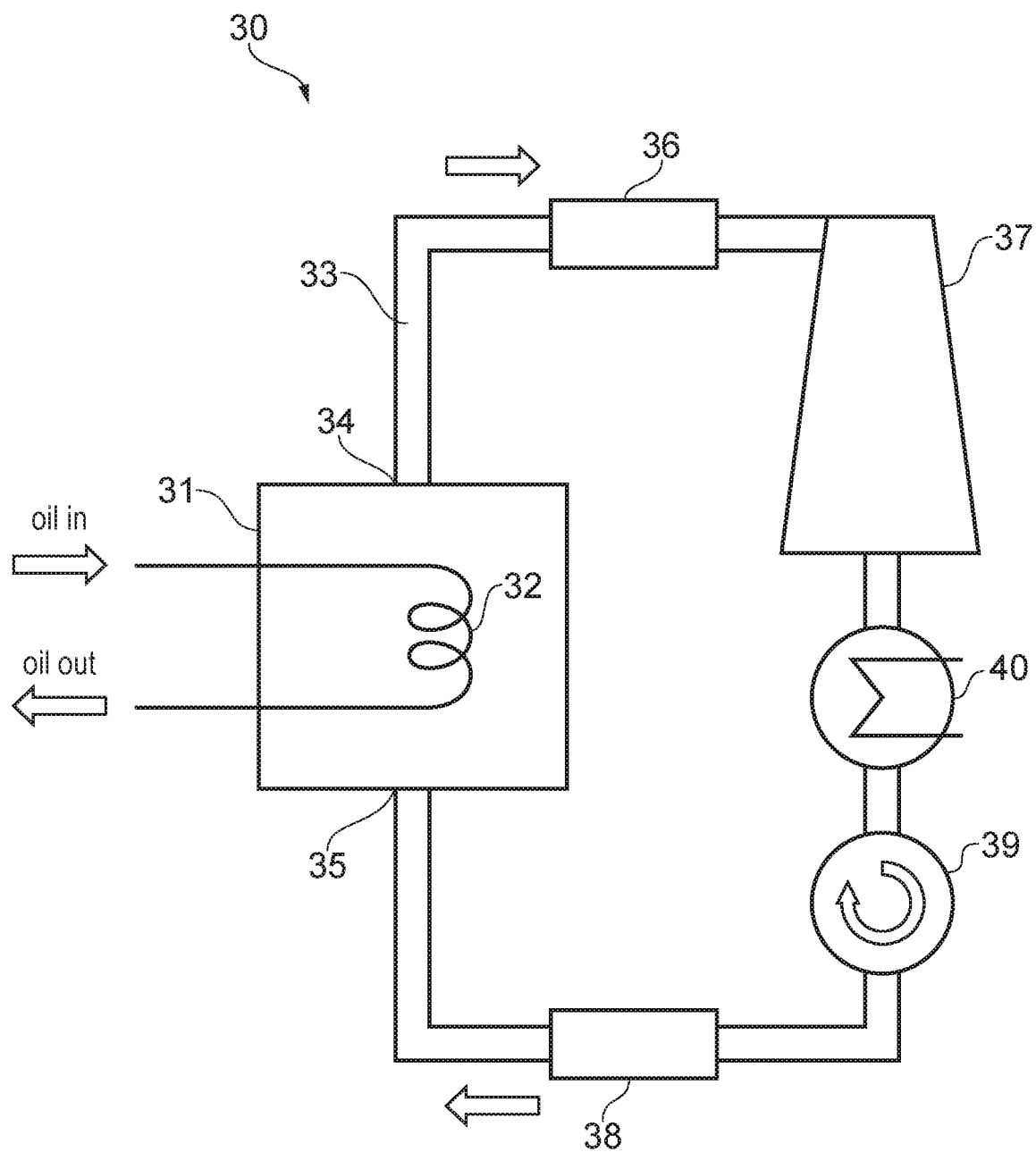
FIG. 2 shows schematically a pulsed pressure, waste heat recovery system.

Oil is used to lubricate and cool electrical generators, bearings, and gears in the transmission system. This results in a large amount of heat being transferred to the oil. Particularly the reduction gearbox 24 transfers significant heat. In order to maintain the oil (and the components that the oil is cooling) at acceptable temperatures, it is necessary to remove this heat. The transfer of heat to the oil represents an energy loss from the engine thermodynamic cycle and, if the heat is lost permanently, it can cause a significant penalty to the engine. One convenient way of recovering this heat back into the engine thermodynamic cycle is to dissipate the energy into the engine fuel flow, e.g. via suitable fuel/oil heat exchangers. However, this heat sink can be insufficient to accept all the waste heat produced. Accordingly, the engine 10 has a pulsed pressure, waste heat recovery system 30 shown schematically in FIG. 2, block arrows indicating directions of fluid flow.

The system 30 has a pressure vessel 31 containing a heat exchanger 32 through which flows heated lubricating and cooling oil scavenged from the engine, inflow and outflow pipes of the heat exchanger passing through the wall of the pressure vessel. The vessel also contains a vaporisable fluid, such as 1,1,1,3,3-pentafluoropropane (R-245fa) or 1,1,1,2-tetrafluoroethane (R-134a). The heat exchanger thus enables transfer of waste heat from the oil to the fluid. This vaporises the fluid and cools the oil such that the need for conventional heat exchangers to cool the oil can be reduced or eliminated.

A flow loop 33 for the vaporised fluid extends from an outlet 34 of the pressure vessel 31 to an inlet 35 to the pressure vessel. On the flow loop are, in flow series: a first non-return valve 36, a turbine 37, and a second non-return valve 38. As the fluid is vaporised, pressure builds up in the pressure vessel. The first non-return valve allows the vaporised fluid to flow from the pressure vessel to the turbine when the pressure of the vaporised fluid in the pressure vessel exceeds a predetermined limit. The turbine then extracts energy from expansion of the vaporised fluid flowing therethrough, while the second non-return valve prevents flow reversal around the flow loop between the turbine and the inlet.

The flow loop 33 may also have a pump 39 to force the expanded fluid to return to the pressure vessel 31 and/or a secondary heat exchanger 40 for re-condensing the fluid.

The system 30 alternates between periods in which the pressure of the vaporised fluid in the pressure vessel exceeds the predetermined limit and energy is extracted by the turbine, and periods of pressure build up in the pressure vessel when the pressure of the fluid in the pressure vessel is below the predetermined limit.

Figure 3:
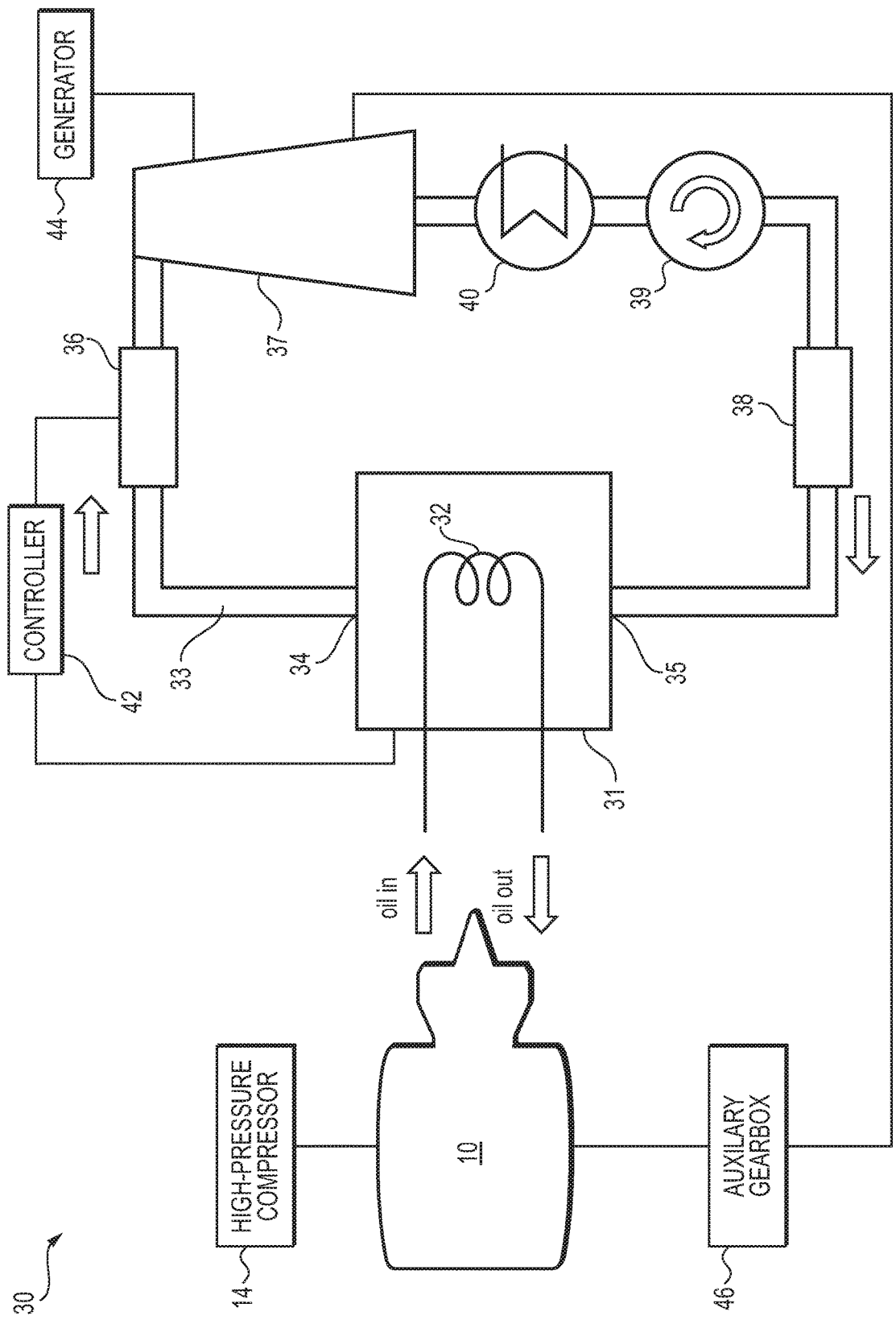
FIG. 3 shows schematically a gas turbine engine including a heat recovery system.

With reference to FIG. 3, the non-return valves 36, 38 can be switched actively, e.g. via a controller 42 based on a sensed pressure reading from the pressure vessel 31, or passively, e.g. due to pre-set valve cracking pressures.

The system 30 takes low grade heat rejected from the gas turbine engine 10 and converts it to higher grade mechanical power that can be used to generate secondary power or returned to the engine cycle. For example power offtake from the turbine 37 can be used e.g. to drive a generator 44 to generate electrical power, or to provide additional mechanical power to drive an auxiliary gearbox 46 of the gas turbine engine 10. Other options are to use the power offtake from the turbine to drive engine pumps.

While the invention has been described in conjunction with the exemplary embodiments described above, many equivalent modifications and variations will be apparent to those skilled in the art when given this disclosure. For example, a heat recovery system of the present invention can be used to reduce the temperature of air cooling flows in a gas turbine engine. In particular, compressed air bled from the high-pressure compressor 14 of the gas turbine engine 10 and used to cool turbine blades and discs, can be cooled by the heat recovery system, thereby reducing the amount of air needing to be bled, and improving engine efficiency. Accordingly, the exemplary embodiments of the invention set forth above are considered to be illustrative and not limiting. Various changes to the described embodiments may be made without departing from the scope of the invention.

The invention claimed is:

1. A heat recovery system comprising:
   a pressure vessel configured to hold a vaporizable first fluid, the pressure vessel containing a heat exchanger configured to transfer heat from a heated second fluid to the first fluid such that the first fluid is vaporized; and
   a flow loop for the first fluid extending from an outlet of the pressure vessel to an inlet of the pressure vessel, the flow loop having in flow series:
   (i) a first non-return valve controlled by a controller, the first non-return valve being configured to:
   allow the vaporized first fluid to be output from the pressure vessel, the vaporized first fluid output from the pressure vessel flowing from the pressure vessel to the turbine only upon the controller acquiring a detected pressure of the vaporized first fluid in the pressure vessel exceeding a predetermined limit, and
   prevent the vaporized first fluid from flowing out of the pressure vessel when the acquired pressure of the vaporized first fluid in the pressure vessel does not exceed the predetermined limit;
   (ii) a turbine configured to extract energy from expansion of the vaporized first fluid flowing through the turbine; and
   (iii) a second non-return valve configured to prevent flow reversal around a flow loop between the turbine and the inlet of the pressure vessel,
   wherein the heat recovery system alternates between first periods in which the pressure of the vaporized first fluid in the pressure vessel exceeds the predetermined limit and energy is extracted by the turbine, and second periods of pressure build up in the pressure vessel when the pressure of the first fluid in the pressure vessel is below the predetermined limit.

2. The heat recovery system according to claim 1, further comprising a pump in the flow loop, the pump being configured to return the expanded first fluid to the pressure vessel through the inlet.

3. The heat recovery system according to claim 1, further comprising a secondary heat exchanger in the flow loop, the secondary heat exchanger being configured to re-condense the expanded first fluid.

4. The heat recovery system according to claim 1, further comprising a generator configured to be driven by the turbine to generate electrical power.

5. A gas turbine engine comprising the heat recovery system according to claim 1.

6. The gas turbine engine according to claim 5, further comprising an engine compressor, wherein the second fluid is engine lubricant oil or compressed air bled from the engine compressor.

7. The gas turbine engine according to claim 5, further comprising an auxiliary gearbox configured to be driven by the gas turbine engine, wherein the turbine is configured to provide additional mechanical power to drive the auxiliary gearbox.

\* \* \* \* \*